Feb. 26, 1963 P. E. KING ET AL 3,079,159

DICTATING MACHINE

Filed June 30, 1960 2 Sheets-Sheet 1

Inventors
PAUL E. KING
RUDOLF F. MALLINA

By Hill, Sherman, Meroni, Gross & Simpson Attys.

Feb. 26, 1963

P. E. KING ET AL

DICTATING MACHINE 3,079,159

Filed June 30, 1960

2 Sheets-Sheet 2

Inventors
PAUL E. KING
RUDOLF F. MALLINA

By Hill, Sherman, Meroni, Gross & Simpson Attys.

United States Patent Office 3,079,159
Patented Feb. 26, 1963

3,079,159

DICTATING MACHINE

Paul E. King, New York, and Rudolf F. Mallina, Hastings on Hudson, N.Y., assignors to Thompson Ramo Wooldridge Inc., Cleveland, Ohio, a corporation of Ohio Filed June 30, 1960, Ser. No. 40,023
7 Claims. (Cl. 274—14)

This invention relates to dictating machines and, more particularly, to a hinged cover for a magnetic disc dictating machine.

In the design of dictating machines, one object is to provide means for protecting the recording mechanism as much as possible. In the case of magnetic disc dictating machines, it is desirable to combine the protecting cover with a mechanism for indexing the tone arm on the disc and returning the tone arm to its starting position.

Such arrangements in the prior art have been deficient in that they require expensive and complicated mechanisms to accomplish these objectives, which is due mainly to the fact that the tone arm is mounted on the cover. Further, the prior art arrangements have failed to completely cover the recording mechanism.

Accordingly, it is a purpose of this invention to provide a cover for a magnetic disc dictating machine that completely covers the recording mechanism.

It is another object of this invention to provide a cover for a magnetic disc dictating machine that automatically returns the tone arm to its starting position when the cover is raised.

Still another object of this invention is to provide a cover for a magnetic disc dictating machine that includes means for indexing the magnetic tone arm.

Other objects, features and advantages of the present invention will be apparent from the following detailed description taken in conjunction with the accompanying figures of the drawings, in which.

As shown on the drawings.

Figure 1:
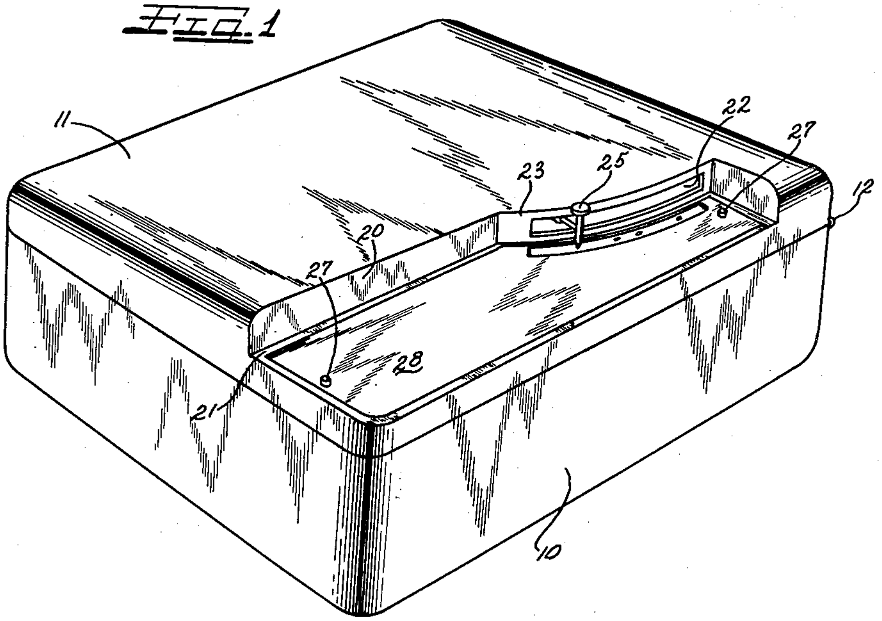
FIGURE 1 is a view in perspective of a magnetic disc dictating machine that has a cover constructed in accordance with the invention.
Figure 2:
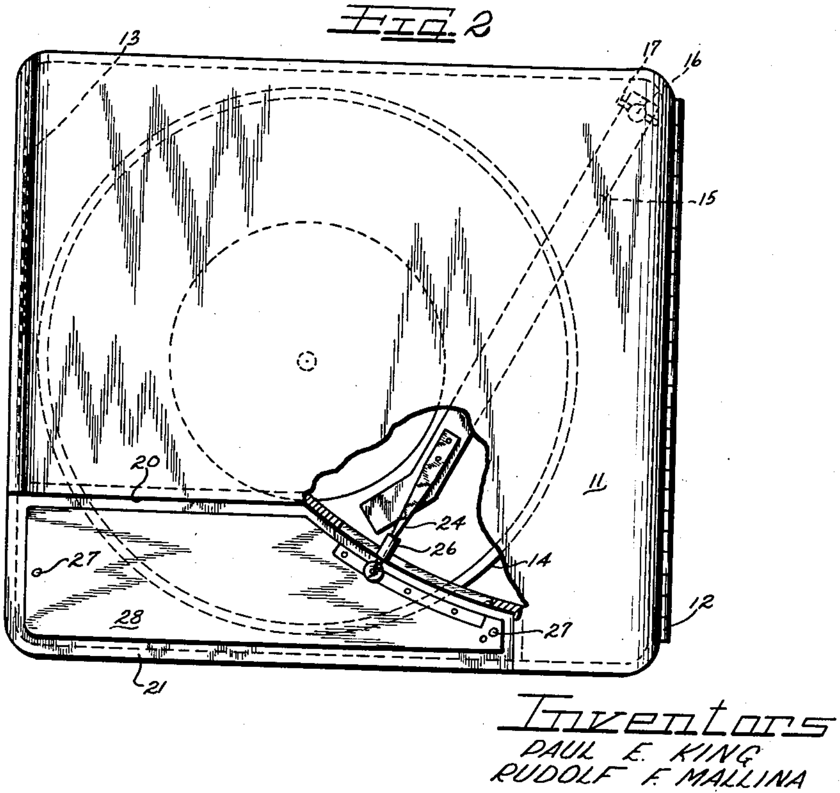
FIGURE 2 is a plan view of the dictating machine with a portion of the cover broken away.
Figure 4:
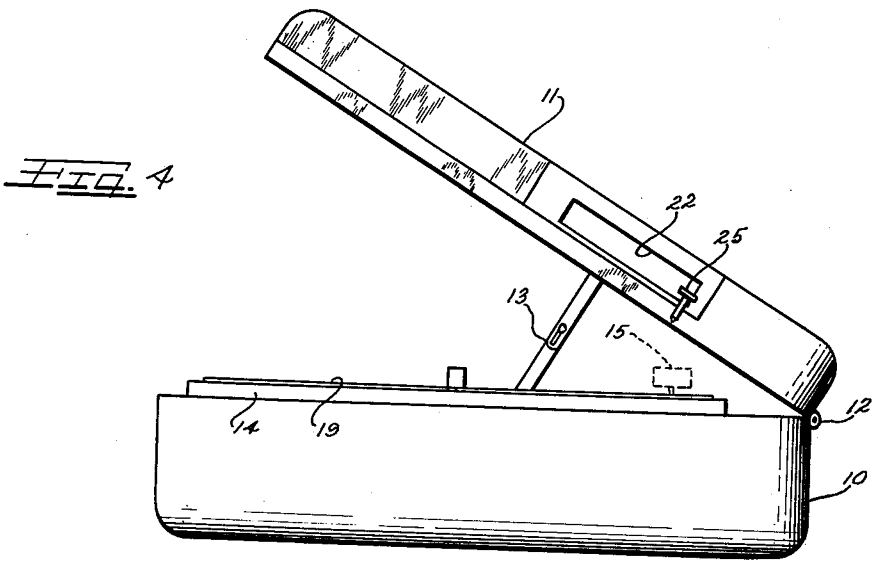
FIGURE 4 is a side view of the dictating machine showing the cover in a raised position.

The dictating machine illustrated in FIGURE 1 includes a base 10, a cover 11 that is hingedly mounted at 12 to the base, and a cover support 13, FIGURES 2 and 4, that is connected to both the cover and the base. The base 10 contains means for supporting a rotatable turntable 14 and magnetic disc 19, and a pivotally mounted tone arm 15.

Figure 3:
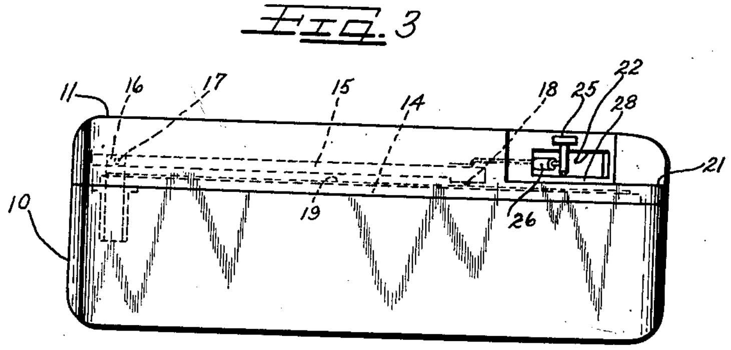
FIGURE 3 is a front view of the dictating machine.

With reference to FIGURES 2 and 3, the tone arm 15 is mounted on the base 10 by means of a vertical hollow shaft 16 and a cross bar 17. The hollow shaft 16 also acts as a conduit for the wires leading to a pole piece 18, FIGURE 5, mounted at the end of the tone arm 15, and, since it is rotatably mounted, permits the tone arm 15 to pivot in a horizontal plane. The cross bar 17 provides a horizontal axis of rotation for the tone arm 15 so that it can be raised and lowered when changing the magnetic disc 19.

Figure 5:
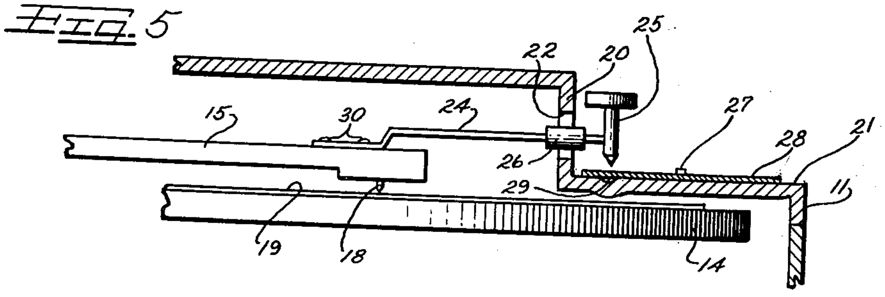
FIGURE 5 is a view partially in section showing the construction of the cover and indexing mechanism.
Figure 6:
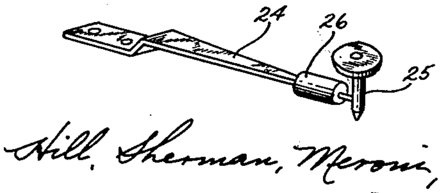
FIGURE 6 is a view of an indexing arm.

The cover 11 includes an inset portion that is bounded by a wall 20 on one side and by a base 21, best shown in FIGURES 1 and 5. An arcuate section 23 of the wall 20 contains a slit 22 that receives an indexing arm 24. This arm 24 is fastened to the end of the tone arm 15 by a plurality of screws 30 and to a knob 25 by a round sleeve 26.

The indexing arm 24, the knob 25 and the sleeve 26 should all be made as small and as light as is practical in order to reduce the weight on the pole piece 18.

The flat base 21 of the inset portion of the cover 11 has two upstanding pins 27 that act as guides for a memo strip 28 that is designed to fit the profile of the base. The base 21 also contains an arcuate groove 29 adjacent to the slit 22 which permits the operator of the dictating machine to punch a hole through the memo strip 28 by pressing the knob 25 downwardly through the memo strip and into the groove 29. The position of an item recorded on the magnetic disc can then be determined by observing the position of the hole in the memo strip. The indexing arm 24 should be constructed so that it can be pressed down with very little effort.

When the operator of the dictating machine wants to remove one disc and replace it with a fresh one, he lifts the cover 11 until the cover support 13 is fully extended and locked in place, as shown in FIGURE 4. This action causes the lower edge of the slit 22 in the cover wall 20 to bear against the round sleeve 26 on the arm 24 and raise the pole piece 18 off of the magnetic disc 19. As the cover 11 is raised to its uppermost position, the force of gravity pulls the tone arm 15 downwardly and the sleeve 26 slides to the end of the slit 22. After the disc has been changed, the operator releases the cover support 13 and allows the cover 11 to return to its closed position. The length of the slit 22 is designed so that the pole piece 18 will be at the starting position on the magnetic disc 19 when the cover 11 is fully closed.

It can be seen that the path followed by the pole piece 18 as it is returned to its starting position is a quasi-spiral one, with the axis of the spiral path being vertical. This is in contrast to the operation of machines where the tone arm is mounted on the cover which requires that the axis of the spiral be a circular arc and not a straight line.

It can be seen that a dictating machine cover constructed in accordance with the invention provides substantial advantages over those of the prior art. In addition to protecting the recording mechanism by entirely covering it, the cover also includes means for automatically returning the tone arm to its starting position whenever the cover is closed. The cover also includes a convenient indexing mechanism which enables the operator to indicate to the transcriber the position on the magnetic disc of an item by simply pressing the knob attached to the tone arm. Since the tone arm is mounted on the base and follows a relatively simple motion, intricate linkages are not required to actuate the indexing mechanism and return the tone arm to its starting position.

It will be apparent that many modifications and variations may be effected without departing from the scope of the novel concepts of the present invention.

We claim as our invention:

1. A cover for a dictating machine having a base that supports a recording mechanism which includes a tone arm, said cover comprising means for hingedly attaching said cover to the base so that said cover can be rotated between an open position and a closed position, said cover having substantially the same outline as said base so that the recording mechanism in the base is completely enclosed when said cover is in the closed position, means for pivotally mounted the tone arm on said base, an arcuate slit formed in said cover, and means attached to the tone arm and extending through said slit for indicating the position of the tone arm when said cover is in the closed position.

2. In a dictating machine having a base, a cover hingedly attached to said base and movable between an open and a closed position, and a tone arm pivotally mounted on said base and enclosed by said cover, the improvement in combination therewith comprising:

(a) means on said cover defining a slit therein; and (b) means attached to said tone arm and extending through said slit for indicating the position of the tone arm when said cover is in the closed position.

3. In a dictating machine having a base, a cover hingedly attached to said base movable between an open and a closed position, and a tone arm pivotally mounted on said base and enclosed by said cover, the improvement in combination therewith comprising:

(a) means on said cover defining a slit therein; and (b) means attached to said tone arm and extending into said slit and operative to be guided by said slit-defining means, in response to movement of said cover, to return said tone arm to its starting position.

4. In a dictating machine having a base, a cover hingedly attached to said base movable between an open and a closed position, and a tone arm pivotally mounted on said base and enclosed by said cover, the improvement in combination therewith comprising:

(a) means on said cover defining a slit therein; and (b) a member attached to said tone arm and extending into said slit;

said slit-defining means being engageable with said member in response to opening of the cover for returning the tone arm toward its starting position, and the end of said slit-defining means being disposed to arrest movement of said member when the tone arm is at its starting position.

5. In a dictating machine having a base, a cover hingedly attached to said base movable between an open and a closed position, and a tone arm pivotally mounted on said base and enclosed by said cover, the improvement in combination therewith comprising:

(a) means on said cover defining a slit therein;

(b) means attached to said tone arm and extending through said slit for indicating the position of the tone arm when said cover is in the closed position; and (c) a member secured to said indicating means and disposed outside of the cover and adapted to mark said arm position.

6. A recording device having a recording mechanism including a tone arm pivotally supported by a base, and a cover hingedly attached to said base for movement between an open and a closed position, the improvement in combination therewith comprising: means on the cover defining a slit therein, said slit receiving a portion of the tone arm; said slit-defining means being engageable with said tone arm portion, when the cover is moved to the open position, and being operative to return the tone arm to its starting position in response to such cover movement.

7. A recording device having a recording mechanism including a tone arm pivotally supported by a base, and a cover hingedly attached to said base for movement between an open and a closed position, the improvement in combination therewith comprising:

(a) means on the cover defining an arcuate slit therein, said slit receiving a portion of the tone arm; said slit-defining means being engageable with said tone arm portion, when the cover is moved to the open position, and being operative to return the tone arm to its starting position in response to such cover movement;

(b) said portion of the tone arm extending through said slit for indicating the position of the tone arm when said cover is in the closed position; and (c) a member secured to said portion of the tone arm and disposed outside of the cover and adapted to mark said arm position.

References Cited in the file of this patent

UNITED STATES PATENTS

| | | |
|---|---|---|
| 1,517,690 | Abt | Dec. 2, 1924 |
| 2,523,340 | Bonsall | Sept. 26, 1950 |
| 2,552,757 | Adler | May 15, 1951 |
| 2,925,009 | Larson | Feb. 16, 1960 |